UNITED STATES PATENT OFFICE.

CORNELIUS T. TOMKINS, OF NEWARK, NEW JERSEY.

IMPROVEMENT IN PROCESSES OF TREATING GYPSUM.

Specification forming part of Letters Patent No. 177,301, dated May 9, 1876; Reissue No. 8,803, dated July 15, 1879; application filed June 23, 1879.

*To all whom it may concern:*

Be it known that I, CORNELIUS T. TOMKINS, of the city of Newark, in the county of Essex and State of New Jersey, have invented a New Method of Treating Gypsum for the purpose of obtaining an acicular crystallization of its atoms; and I hereby declare the following to be a description of the same in such full, clear, concise, and exact terms as will enable any one skilled in the art or science to which it appertains, or with which it is most nearly connected, to make and practice the same.

Dehydrated gypsum, or sulphate of lime, is a well-known article of commerce. The manner of producing it is also well known. No description, therefore, of the article itself, or of the manner of producing it, is necessary to a proper understanding of my invention, the object of which is to produce an acicular crystallization of the gypsum of commerce, or sulphate of lime.

The invention begins, therefore, with the treatment of the gypsum of commerce, and results in converting a large part of it in acicular crystals having a felting or malting property.

The invention comprises, first, a treatment of gypsum by which the above-mentioned result is obtained; second, the acicular crystallized gypsum produced by that treatment.

The treatment consists of mixing gypsum and water together in a tank of suitable form and size, in the proportion of about one pound of gypsum to from four to seven of water by weight, and of continually stirring or agitating the mixture with a suitable stirrer for a period of about forty minutes, at the end of which time the tendency of the gypsum to set or crystallize in a mass is passed, and is succeeded by the acicular crystallization of its atoms.

The gypsum, which, at the commencement of the treatment, is an amorphous powder, consisting of small fragments of coarse rhomboidal prisms, becomes entirely changed in its crystalline character. The coarse rhomboidal prisms becomes a delicate acicular crystal of microscopic minuteness, the average diameter of which is about one-fifteen-thousandth ($\frac{1}{15000}$) of an inch. This crystalline form, which is entirely distinct from the crystals composing the gypsum previous to its treatment, is, in a remarkable degree, fitted for use in the manufacture of paper or of bleached cotton goods, producing an article of superior hardness, firmness, and opacity.

The crystalline particles produced by this process are more minute and uniform in size than can be obtained by any other means, with the additional advantage that, owing to their acicular or needle-like form, they do not escape through the meshes of the wire-cloth used in paper machinery.

If we take the ordinary material used in paper-manufacture called "terra-alba," which is native gypsum reduced to an impalpable powder, and compare it with this new product by means of the microscope, we find that the former consists of fragmentary portions of rhomboidal prisms, exceedingly variable in size and character. The average diameter of the smaller of these particles is one-five-thousandth ($\frac{1}{5000}$) of an inch.

The same material, after treatment by this process, exhibits under the microscope slender crystals, the great length of which, as compared with their diameter, makes them of essential service in the felting or matting together of the fiber employed in the manufacture of paper.

To obtain the desired result it is absolutely necessary that the mixture of gypsum and water shall have consistency enough—that is, be thick enough—to cause the atoms of gypsum to abrade or rub against each other in comparatively close contact in the operation of stirring, by which the mass is drawn apart and the atoms made to crystallize in a felting acicular form.

Merely mixing water and gypsum together through any length of time will not necessarily produce the desired result. If the mixture be too thin, the continuous stirring will not yield the desired form of crystal.

The proportion of about one of gypsum and four of water by weight yields a satisfactory result, and is the one generally adopted by me.

Having thus described my invention, I claim and desire to secure by Letters Patent—

1. The described retreatment of the calcined or dehydrated gypsum of commerce, or sulphate of lime, for the purpose of obtaining an acicular crystallization of its atoms possessing a felting property, and free from all tendency to set or crystallize in mass.

2. As a new article of manufacture, the minutely crystalline acicular form of sulphate of lime herein described, suitable for use in the manufacture of paper, &c., as set forth.

CORNELIUS T. TOMKINS.

Witnesses:

AMOS BROADNAX,

H. C. HUDSON.